(12) United States Patent
Thompson

(10) Patent No.: US 6,279,732 B1
(45) Date of Patent: Aug. 28, 2001

(54) CAROUSEL APPARATUS

(75) Inventor: Edward A. Thompson, Rhome, TX (US)

(73) Assignee: Texonics, Inc., Denton, TX (US)

( * ) Notice: Subject to any disclaimer, the term of this patent is extended or adjusted under 35 U.S.C. 154(b) by 0 days.

(21) Appl. No.: 09/244,617

(22) Filed: Feb. 4, 1999

(51) Int. Cl.[7] .................................. B65G 17/16
(52) U.S. Cl. .................... 198/799; 198/797; 198/800
(58) Field of Search ............................ 198/797, 799, 198/800, 801

(56) References Cited

U.S. PATENT DOCUMENTS

| | | | |
|---|---|---|---|
| 425,117 | * 4/1890 | Van Doren | 198/799 X |
| 2,816,000 | * 12/1957 | Scholfield et al. | 198/799 X |
| 3,017,985 | * 1/1962 | Kiwi | 198/800 X |
| 4,067,437 | 1/1978 | Frantl et al. | 198/800 |
| 4,334,609 | * 6/1982 | Akashi | 198/799 X |
| 4,493,414 | 1/1985 | Nevo-Hacohen | 198/800 |
| 4,643,495 | * 2/1987 | Pepping et al. | 198/800 X |
| 4,681,452 | 7/1987 | Watanabe | 356/375 |
| 5,058,729 | * 10/1991 | Shibata | 198/799 X |
| 5,207,314 | 5/1993 | Ueda et al. | 198/800 |
| 5,407,264 | * 4/1995 | Giegerich et al. | 198/800 X |

* cited by examiner

Primary Examiner—James R. Bidwell
(74) Attorney, Agent, or Firm—Howrey Simon Arnold & White, LLP; Ira D. Finkelstein

(57) ABSTRACT

A carousel apparatus including a track plate, two or more tracks that define a closed circuit, and an alignment block that travels about the closed circuit while maintaining a fixed orientation. The alignment block may be adapted to support a load so that the load may be recirculatively transported while maintaining a fixed orientation.

34 Claims, 8 Drawing Sheets

CAROUSEL APPARATUS

BACKGROUND OF THE INVENTION

1. Field of the Invention

This invention relates generally to carousel apparatus, and more particularly, to a carousel apparatus that moves products in a recirculating pattern without affecting the orientation of those products. Even more particularly, this invention relates to a programmable presentation system which recirculatively presents items in a fixed orientation for assembly line operation.

2. Description of Related Art

In many industries, products are assembled by workers who remove items from bins or holders and then install those particular items on or into the products. If a worker reaches for an item from the wrong bin or container, the item has a high risk of being improperly placed. Also, in many industries, the parts and bins used by the workers can be spread out over a large area requiring extended reaching of the workers to retrieve the parts.

Programmable vertical carousel systems have been used for bulk storage of items. However, these systems often use gravity and swivel bearings, so that the bins or containers remain horizontal in an equilibrium state only because gravity holds the bins or containers below the swivel bearings as they circulate around the carousel. Thus, although the items in the vertical carousel may remain horizontal sometimes, the items may be subject to tipping back and forth or rotating. This tipping and rotational motion may cause the items to spill from the container and may prevent the presentation of heavy objects within the carousel, for the rotational motion may be too great. In sum, these swivel bearing systems lack a mechanism to compensate for rotation or tilting of the bins caused by uneven distribution of items in the bins. Additionally, these systems lack a mechanism to compensate for rotation or tilting caused by an operator pushing on one side of the bin or container.

SUMMARY OF THE INVENTION

In one respect, the invention is an apparatus including a track plate, two or more tracks, and an alignment block. The two or more tracks are configured in operative relationship with the track plate and are arranged in a spaced relationship. The tracks define a closed circuit. The alignment block is configured to engage the two or more tracks to constrain rotational motion of the alignment block and to travel about the closed circuit while maintaining a fixed orientation.

In other aspects, the alignment block may engage the two or more tracks with two or more bearings. At least one of the two or more tracks may include a groove defined in the track plate. At least one of the two or more tracks may include a T slot. The closed circuit may include a polygon shape. The track plate may be oriented horizontally. The tract plate may include a horizontal support structure. The apparatus may also include a driving mechanism coupled to the alignment block and configured to drive the alignment block about the closed circuit. The driving mechanism may include a motor and an attachment chain coupled to the motor. The track plate may include an inner plate in spaced relationship with an outer plate, and the drive chain may be disposed generally between the inner and outer plates. The motor may be outwardly adjacent the outer plate, and the alignment block may be inwardly adjacent the inner plate. The apparatus may also include a pusher coupled to the driving mechanism and rotatably coupled to the alignment block. The pusher may be configured to direct the alignment block along the two or more tracks and to rotate about the alignment block to affect a change in direction of the alignment block. The apparatus may include a bracket coupled to the pusher. The bracket may be configured to support a container or device. Such devices may include a paste applicator, a glue applicator, a solder gun, a welding head, a laser cutter, a rotary cutting tool, or any combination thereof.

In another respect, the invention is a carousel, including a track plate, a set of tracks, an alignment block, a driving mechanism, and a pusher. The set of tracks is configured in operative relation to the track plate and defines a closed circuit. The alignment block is configured to engage the set of tracks to constrain rotational motion of the alignment block. The driving mechanism is configured to drive the alignment block about the closed circuit. The pusher is coupled to the driving mechanism and rotatably coupled to the alignment block to affect a change in direction of the alignment block as the alignment block travels about the closed circuit. The alignment block is adapted to at least partially support or guide a load and to travel about the closed circuit while maintaining a fixed orientation so that the load may be transported.

In other aspects, the driving mechanism may include a motor, an attachment chain coupled to the pusher, and a drive shaft coupling the attachment chain to the motor. The track plate may be arranged vertically or horizontally. The carousel may also include a bracket coupled to the pusher. The carousel may also include an arm coupled to the alignment block and a supporting member coupled to the arm. The arm may be configured to cooperatively support the supporting member and may be adapted to travel about the closed circuit with the supporting member remaining in a fixed orientation. The set of tracks may include a set of T slots. The alignment block may engage the set of tracks by two or more cam-following bearings. The set of tracks may include a first portion including a first number of tracks and a second portion including a second number of tracks. That first number may be two and the second number may be three. The carousel may also include a programmable location indicator system configured in operative relation to the carousel. The programmable location indicator system may include a light pointer and a pointer motor coupled to the pointer. The pointer motor may be configured to direct light from the light pointer in a programmable manner.

In another respect, the invention is a carousel for presenting a product to an operator, including a first and second track plate, a first and second plurality of tracks, a first and second alignment block, two or more cam following bearings coupled to the first alignment block, two or more cam following bearings coupled to the second alignment block, a driving mechanism, and a first and second pusher. The first plurality of tracks define a first closed circuit. The second plurality of tracks define a second closed circuit. The first alignment block is configured to engage the first plurality of tracks. The two or more cam-following bearings coupled to the first alignment block are configured to constrain rotational motion of the first alignment block upon engagement of the first plurality of tracks. The second alignment block is configured to engage the second plurality of tracks. The two or more cam-following bearings coupled to the second alignment block are configured to constrain rotational motion of the second alignment block upon engagement of the second plurality of tracks. The first pusher is coupled to the driving mechanism and rotatably coupled to the first alignment block. The first pusher is configured to direct the first alignment block about the first closed circuit and to rotate about the first alignment block to affect a change in direction of the first alignment block. The second pusher is coupled to the driving mechanism and rotatably coupled to the second alignment block. The second pusher is configured to direct the second alignment block about the second closed circuit and to rotate about the second alignment block to affect a change in direction of the second alignment block. The first and second alignment blocks are adapted to cooperatively support a load and to travel about the first and second closed circuits in tandem, maintaining a constant relative position and a fixed orientation so that the load may be recirculatively transported.

In other aspects, the first plurality of tracks may include a first plurality of T-slots defined along an interior of the first track plate. The second plurality of tracks may include a second plurality of T-slots defined along an interior of the second track plate. The driving mechanism may include a motor, a first attachment chain coupled to the first pusher, a first sprocket configured to engage the first attachment chain, a second attachment chain coupled to the second pusher, a second sprocket configured to engage the second attachment chain, and a common drive shaft coupled to the motor and to the first and second sprockets. The first track plate may include a first inner plate in spaced relationship with a first outer plate. The second track plate may include a second inner plate in spaced relationship with a second outer plate. The first attachment chain may be arranged vertically and disposed generally between the first inner and the first outer plate. The second attachment chain may be arranged vertically and disposed generally between the second inner and the second outer plate. The closed circuits may include at least one generally horizontal portion including at least a top and a bottom parallel track, at least one generally vertical portion including at least a left and a right parallel track, and at least one generally angled portion including at least an upper, a center, and a lower parallel track. Four cam-following bearings may be coupled to each of the first and second alignment blocks. Two of the four cam-following bearings may be generally diagonal. Two of the four cam-following bearings may engage the top parallel track. Two of the four cam-following bearings may engage the bottom parallel track. Two of the four cam-following bearings may engage the left parallel track. Two of the four cam-following bearings may engage the right parallel track. One of the four cam-following bearings may engage the upper parallel track. The two generally diagonal of the four cam-following bearings may engage the center parallel track. One of the four cam-following bearings may engage said lower parallel track. The motion of the alignment blocks may be programmable. The carousel may also include a user interface adapted to transmit instructions to the carousel. The carousel may also include a programmable location indicator system configured in operative relation with the carousel. The programmable location indicator system may include a light pointer and a pointer motor coupled to the pointer. The pointer motor may be configured to direct light from the light pointer in a programmable manner.

Other features and advantages of the present invention will become apparent with reference to the following description of illustrative embodiments in connection with the accompanying drawings wherein like reference numerals have been applied to like elements, in which:

DESCRIPTION OF ILLUSTRATIVE EMBODIMENTS

The disclosed apparatus may be useful for, among other things, recirculatively presenting items to an operator, with those items maintaining a fixed orientation so as to reduce or eliminate tipping, spilling, or rocking of those items. The apparatus may also be useful for programmably presenting specific items to a user so that the possibility of the user committing error by picking up the wrong item may be reduced or eliminated. The apparatus may also be useful for presenting items to a user while storing other items within the apparatus. The apparatus may also be useful for presenting an item to a user while indicating visually to that user where to place that item. The apparatus may also be useful in vertically storing items and condensing the work envelope of the worker. The apparatus may also be useful as a conveyor or as an x-y positioning system. By presenting items to a user at a near position, the chance of repetitive trauma to the user may be reduced.

Figure 1:
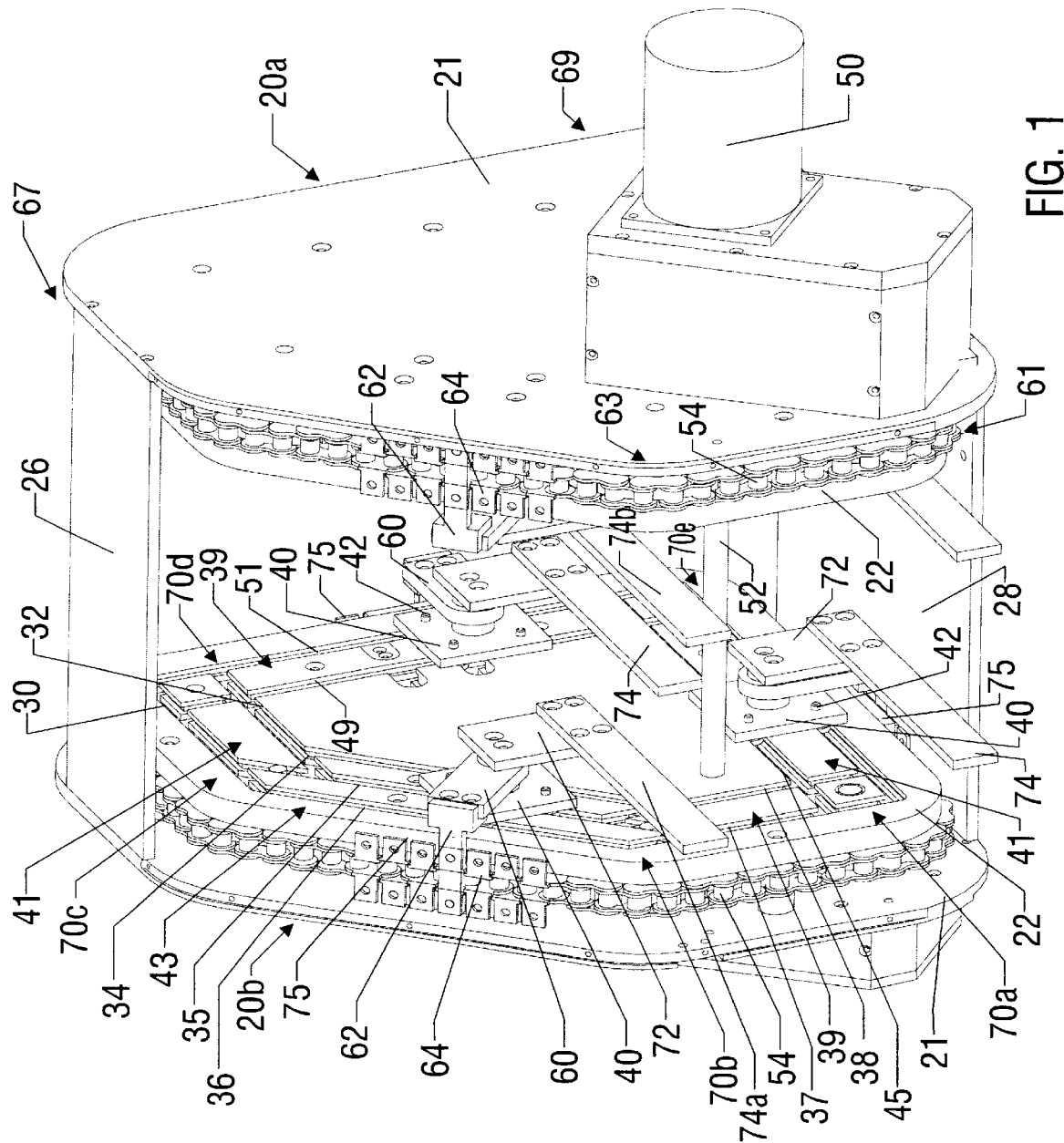
FIG. 1 shows a carousel according to one embodiment of the present disclosure.

In one embodiment of the presently disclosed apparatus, a carousel 10 as shown in FIG. 1 is employed. In this embodiment, carousel 10 includes two track assemblies 20, made up of right track plate 20a and left track plate 20b. Track assemblies 20 may each include an outer plate 21 and an inner plate 22, which may be arranged in a spaced relationship, as is shown. Carousel 10 may also include an upper plate 26, which may join the two track assemblies 20. Likewise, carousel 10 may include a bottom plate 28, which may similarly join track assemblies 20. In one embodiment, the outer plate 21 may be constructed from aluminum and inner plate 22 may be constructed from delrin, but any other suitable material known in the art may be used. The size and shape of track assemblies 20 may vary considerably according to need, but in one embodiment, each track plate may be approximately 23.5" by 23.5". In one embodiment, track plates 20a and 20b may be spaced approximately 8" apart, but it is to be understood that the spacing may vary widely. Additionally, with the benefit of this disclosure, one may choose to use a single track assembly 20, for instance, right track plate 20a. Such an arrangement may be beneficial for the presentation of smaller or lighter items. Also, such a one-track plate arrangement may be useful when it is important to limit the physical size of carousel 10 or when a horizontal presentation system is desired.

In one embodiment, carousel 10 may include two or more tracks configured in operative relationship with track assemblies 20, and more particularly, with interior sides of inner plates 22. The two or more respective tracks may define patterns set out in mirror image to adjacent patterns so as to cooperatively define a pattern or patterns for opposing alignment blocks to follow. The two or more tracks may each define respective closed circuits. As used herein, a "closed circuit" refers to any configuration of tracks that encloses a bounded area. Thus, a closed circuit may include, but is not limited to, for example, a triangular pattern, a rectangular pattern, or any other polygon pattern. In the illustrated embodiment of FIG. 1, the closed circuits in each of track plates 20a and 20b trace out the same mirror image pattern. Further, it will be understood that track need not be configured as a closed circuit, but may instead be configured as an open circuit upon which one or more alignment tracks may move in reciprocal patterns.

In one embodiment, tracks may be made of grooves defined in inner plates 22. In the illustrated embodiment, the plurality of tracks 30, 32, 34, 35, 36, 37, and 38 are made of T-slots defined in an interior side of inner plate 22. As used herein, a "T-slot" is a slot with a larger cross sectional area at the bottom than at the top. With the benefit of this disclosure, those of skill in the art will understand that the T-slots according to the present disclosure may be substituted with of any other suitable type of slot, opening, groove, shelf, or slit known in the art. Moreover, tracks may be mounted to, rather than defined in, track plates 20a and 20b. Tracks 30 and 32 form a set of tracks, and more particularly, a set of T-slots. Tracks 34, 35, and 36 also form a set of tracks, and more particularly, a set of T-slots. Likewise, tracks 37 and 38 form a set of tracks, and more particularly, a set of T-slots.

In the illustrated form, the sets of T-slots form a closed circuit. In this example, the closed circuit has a generally triangular pattern with two generally vertical portions 39, two generally horizontal portions 41, and a generally angled portion 43. In one embodiment, any one or all of those portions may be made up of a plurality of tracks arranged in parallel relationship. As illustrated, generally angled portion 43 is made of three parallel tracks 34, 35, and 36. Upper generally horizontal portion 41 may be made of two parallel tracks 30 and 32. Lower generally horizontal portion 41 may be made of two parallel tracks 45 and 47. Left vertical portion 39 may be made of two parallel tracks 37 and 38. Right vertical portion 39 may be made of two parallel tracks 49 and 51.

In one embodiment, carousel 10 may include one or more alignment blocks 40. Each alignment block 40 may be configured to movably or slidably engage two or more tracks. Bearings may be coupled to alignment block 40 to achieve engagement of the tracks and to facilitate motion along those tracks. In the illustrated embodiment, four bearings, and more particularly, four cam-following bearings 42 are coupled to each alignment block 40. With the benefit of the present disclosure, those of skill in the art will understand that many structures may be suitably substituted for cam-following bearings including, but not limited to, rollers, pegs, slides, shafts, bolts, or any other attachment device that supports, guides, or reduces the friction of motion between parts. In this illustrated embodiment, cam-following bearings 42 ride within T-slots defined in interior sides of inner plates 22. Riding within the T-slots, cam-following bearings 42 and alignment block 40 may travel about the closed circuit of carousel 10, following a path defined by a plurality of tracks.

Engagement of an alignment block 40 may constrain motion of that alignment block. In particular, engagement may constrain both rotational motion and lateral, tipping motion, thereby preventing an alignment block from tipping, rotating, or rocking back and forth while traveling about the tracks, even if the alignment block is supporting a load. In the illustrated embodiment, cam-following bearings 42 are arranged in a generally rectangular pattern about alignment blocks 40. In this embodiment, the cam-following bearings ride within T-slots in such a manner that rotational motion of alignment blocks 40 is eliminated or nearly eliminated. Turning to FIG. 1, alignment blocks 40 are prevented from rotating, for instance, in a clockwise direction because two or more cam-following bearings 42 are constrained by the T-slots. Counterclockwise rotation is prevented for the same reason. Additionally, the T-slots constrain lateral motion (i.e. motion directly out away from inner plate 22 and motion directly towards inner plate 22) by the close fit of cam-following bearings within the T-slots.

In one embodiment, alignment block 40 is configured to travel about a closed circuit while maintaining a fixed orientation. In the illustrated embodiment, alignment blocks 40 travel with cam-following bearings 42 about the closed circuit defined by the tracks of T-slots defined in inner plate 22. In this embodiment, alignment blocks 40 are able to maintain a fixed orientation due, in part, to the arrangement of bearings coupled to alignment blocks 40 and the corresponding design of the tracks associated with each track assembly 20, as is illustrated in FIG. 1.

Figure 2:
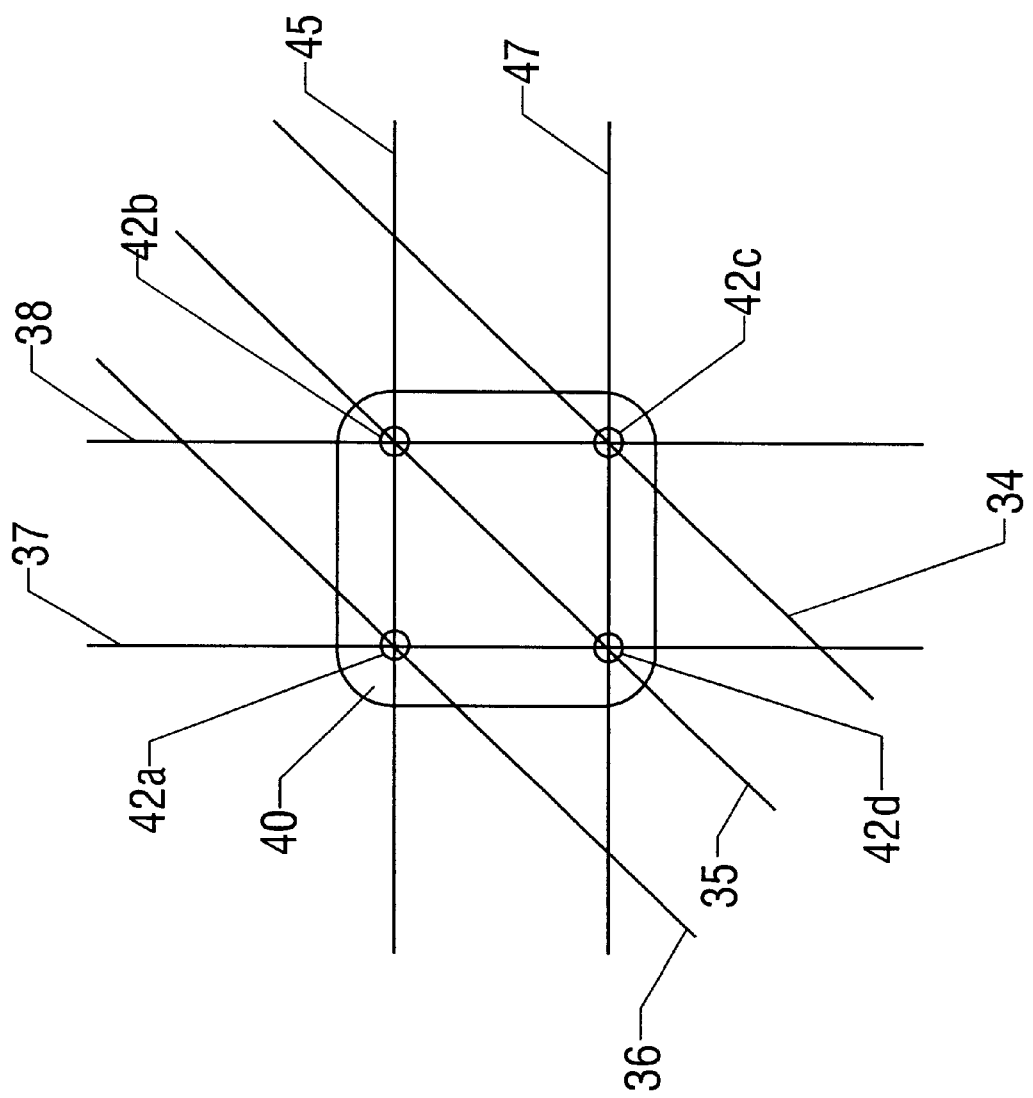
FIG. 2 is a simplified schematic view of a configuration of tracks and associated alignment block according to one embodiment of the present disclosure.

Turning to the embodiments depicted in FIGS. 1 and 2, it can be seen that when an alignment block 40 is riding upon a generally horizontal portion of tracks, for instance lower portion 41, an upper two cam-following bearings, such as cam following bearings 42a and 42b, may engage a top parallel track 45. Similarly, a bottom two cam-following bearings, such as cam following bearings 42c and 42d, may engage bottom parallel track 47. Also shown in the embodiment of FIG. 1 is an alignment block 40 riding upon a generally vertical portion of track 39. In this embodiment, two leftward cam-following bearings, such as cam following bearings 42a and 42d, may engage left parallel track 49 while two rightward cam-following bearings, such as cam following bearings 42b and 42c, may engage right parallel track 51. In the illustrated form, an alignment block 40 is also shown traveling about a generally angled portion of track 43. In this embodiment, a single upper left cam-following bearing, such as cam following bearing 42a, may engage upper parallel track 36. Two generally diagonal cam-following bearings, such as cam following bearings 42b and 42d, may engage center parallel track 35. A single lower right cam-following bearing, such as cam following bearing 42c, may engage lower parallel track 34.

Upon the engagements described above, the alignment blocks illustrated in FIGS. 1 and 2 may be prevented from rotational and tipping motion and may ride along the plurality of tracks, tracing out the closed circuit defined by those tracks while maintaining a fixed orientation. Advantageously, in this embodiment, alignment blocks 40 are able to maintain a fixed orientation because as an alignment block 40 changes direction, different cam-following bearings engage different tracks such that the relative orientations of the bearings and the tracks keep the orientation of the alignment blocks fixed, relative to, for instance, bottom plate 28. In one embodiment, alignment blocks 40 of FIGS. 1 and 2 maintain an orientation in which top and bottom pairs of cam-following bearings are generally parallel with the bottom plate 28 while right and left pairs of cam-following bearings are generally perpendicular to bottom plate 28, as each alignment plate travels around the closed circuit depicted in FIG. 1.

Figure 3:
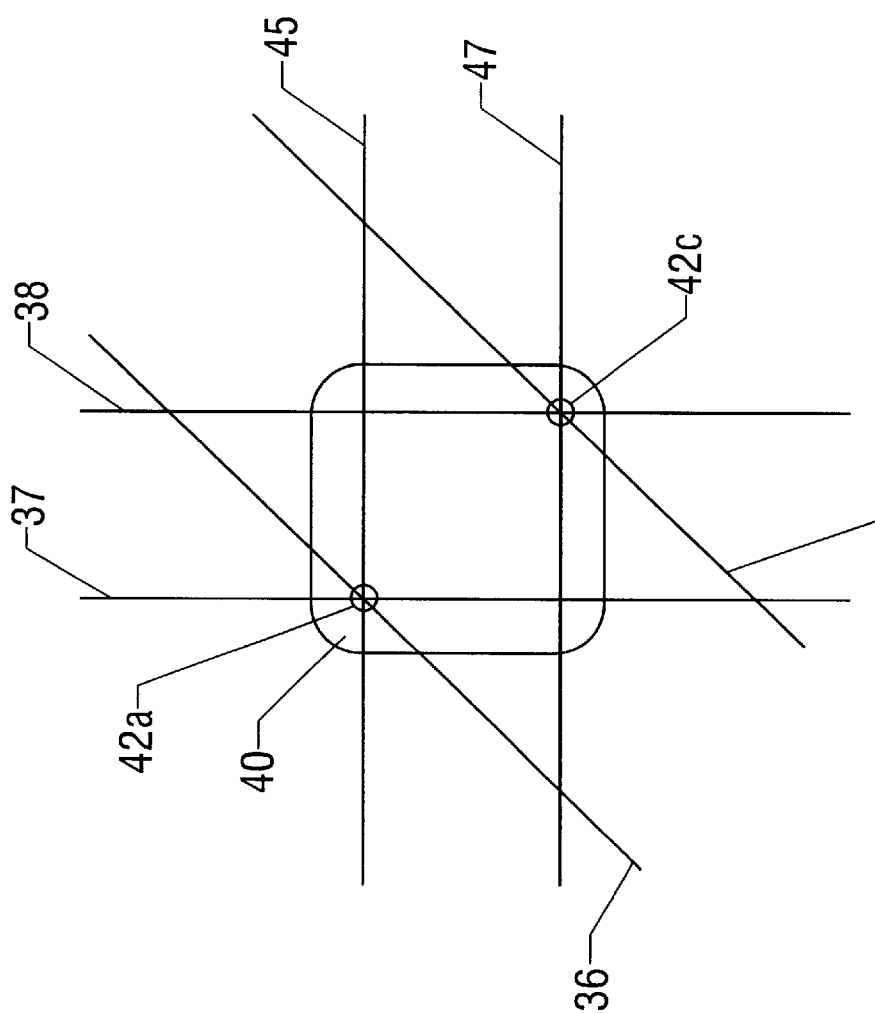
FIG. 3 is a simplified schematic view of a configuration of tracks and associated alignment block according to another embodiment of the present disclosure.

In the embodiment of FIG. 3, only two bearings are utilized to achieve fixed-orientation motion of alignment block 40. In this embodiment, as alignment block 40 travels along a generally horizontal portion of tracks, cam-following bearing 42a engages a top parallel track, here track 45, while cam-following bearing 42c engages a bottom parallel track, here track 47. While traveling about a generally angled portion of track, cam-following bearing 42a may engage upper parallel track 36 while cam-following bearing 42c may engage lower parallel track 34. While traveling about a generally vertical portion, cam-following bearing 42a may engage left parallel track 37 while cam-following bearing 42c may engage right parallel track 38. With the benefit of the present disclosure, those of skill in the art will understand that more or fewer bearings arranged in different configurations may be used to achieve fixed-orientation motion. For instance three bearings may be arranged to engage different tracks while maintaining a fixed orientation. Likewise, more than four bearings may be arranged with the benefit of the present disclosure to accomplish fixed-orientation motion.

Figure 4:
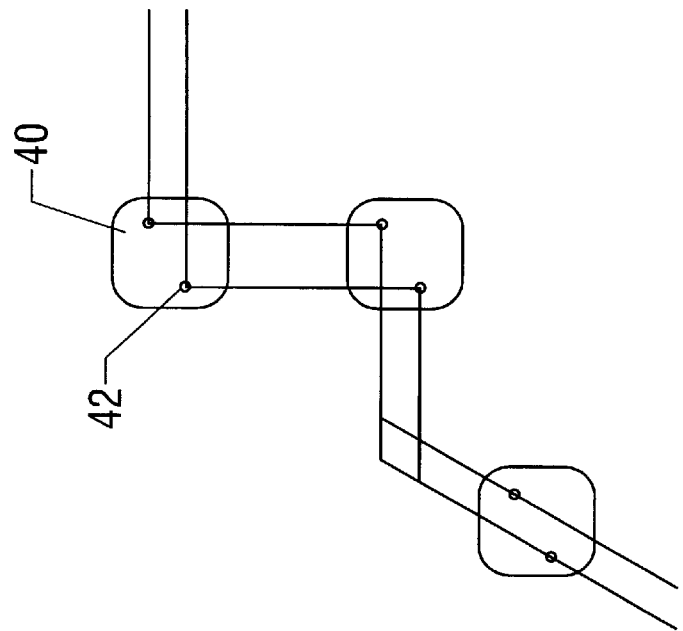
FIG. 4 is a simplified schematic view of a portion of a closed circuit according to one embodiment of the present disclosure.

FIG. 4 demonstrates that tracks of carousel 10 may be arranged in any number of patterns. In the embodiment of FIG. 4, a portion of a closed circuit is shown. In this embodiment, alignment blocks 40 may trace out a pattern including a first generally angled portion, followed by a generally vertical portion, followed by a generally horizontal portion. As may be seen from FIG. 4, the arrangement of tracks and the two bearings 42 allow for fixed-orientation motion substantially free from any rotations or tipping.

In one embodiment, carousel 10 includes a driving mechanism adapted to drive alignment blocks 40 about the closed circuits of carousel 10. In the illustrated embodiment of FIG. 1, the driving mechanism includes a motor 50. Motor 50 may be any power unit that imparts motion and may include, but is not limited to, electric motors, internal combustion engines, hydraulic or pneumatic powered motors, or stepper/servo motor systems. In one embodiment, motor 50 may be a NEMA34 stepper motor. In this embodiment, motor 50 may be mounted, as shown, outwardly adjacent outer plate 21, while alignment blocks may be positioned inwardly adjacent inner plate 22. In particular, in the illustrated form, motor 50 is mounted directly outwardly onto outer plate 21. Such a placement advantageously allows for flexible positioning of track assemblies 20. In particular, with motor 50 attached as illustrated in FIG. 1, one may adjust the distance between left track plate 20b and right track plate 20a without motor 50 getting in the way. More particularly, track assemblies 20 may be spaced close together to allow for the presentation of small items, or they may spaced far apart to allow for the presentation of larger, perhaps heavier, items.

In one embodiment, motor 50 may be programmable. As used herein, a "programmable" motor is one in which a user may direct according to specific instructions. The instructions may be stored in an appropriate memory device, such as in a memory associated with a microprocessor. The instructions may be sent via an appropriate user interface adapted to allow for the creation, modification, and/or transmission of instructions to motor 50. Instructions may come from devices such as a programmable logic controller, a motion controller, or a computer. Instructions may be stored directly in a stepper or servo motor electronic drive with activation coming from one or more switches of several forms, such as press buttons, toggle buttons, photo-sensors, proximity sensors, or other operator input devices. A user interface may allow a user to set up a particular pattern of parts bins to be presented to a user. A user may use the user interface to call up specific programs for a specific operation. The user may trigger a switch or other input device to start the system, and after removing a part, the user may trigger the system again so that it may present a subsequent item.

In one embodiment, motor 50 may be programmable and exhibit characteristics similar to a programmable x-y positioning or rotary positioned system known in the art. Specifically, motor 50 may move by counting a string of pulses it receives, or it may move until an encoder sends a certain number of pulses back to a controller, at which time the controller may stop motor motion.

In one embodiment, a user interface may be utilized to program a carousel to present items to a user following a specific sequence. Sequences may consist of sequential or non-sequential presentation of items, depending on the desires of the user. In a non-sequential presentation pattern, an algorithm may be used to determine the shortest move to called-for presentation position. Such an algorithm, may, for instance, determine whether it would be quicker to rotate clockwise or counter-clockwise to present a certain item to a user based upon the current position of the carousel.

A driving mechanism may further include one or more driving chains or belts. In the illustrated embodiment, attachment chains 54 may be used, but it is contemplated that any other suitable mechanism may be used to transfer motion from motor 50. Attachment chains 54 may be coupled to motor 50 through suitable timing belts, chains, gears, sprockets, flat or v-belts, or pulleys so that alignment blocks 40, coupled to the attachment chains 54, may be propelled about closed circuits of carousel 10. In the illustrated embodiment, attachment chains 54 may be arranged vertically (i.e., generally perpendicular to bottom plate 28) and may be disposed generally between inner plate 22 and outer plate 21. Such a placement advantageously allows the distance between track assemblies 20, if two or more track assemblies are used, to be adjusted without the driving mechanism getting in the way.

A driving mechanism may further include one or more pulleys, wheels, rollers or sprockets configured to engage attachment chains 54. In the illustrated form, sprockets are disposed generally between inner plate 22 and outer plate 21 at positions where a change in direction is encountered in the closed circuit. In particular, a sprocket is typically positioned at locations between inner plate 22 and outer plate 21 as indicated in FIG. 1 by arrows 61, 63, 65, 67, and 69 (arrow 69 signifies that a sprocket may be placed at the back, rear, lower end of carousel 10). Additional sprockets may be provided. The relative sprocket configuration of each of track assemblies 20 may be mirror image or of different configuration.

A driving mechanism may further include a common drive shaft 52, which may be coupled to motor 50 and to sprockets engaging attachment chains 54. In particular, common drive shaft 52 may be coupled to belts, drive chains, or gears which serve to transfer motion to the drive sprockets, which, in turn, may move attachment chains 54 and alignment blocks 40. The use of a common drive shaft 52, similarly-situated sprockets, and mirror image closed circuit patterns upon each of track assemblies 20 allow alignment blocks 40 situated directly opposite one another on opposite track assemblies 20 to move in tandem.

Figure 5:
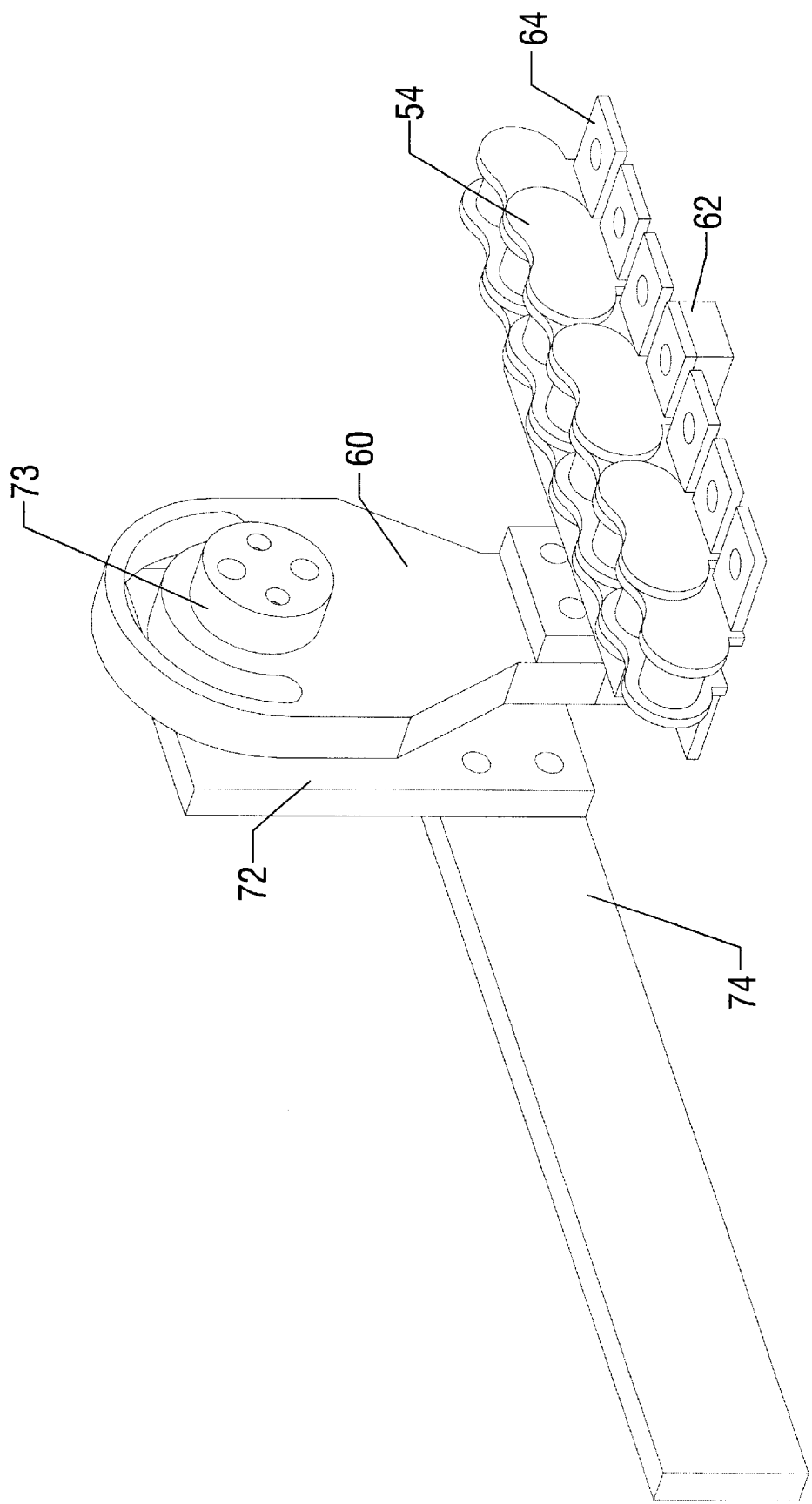
FIG. 5 is a partial perspective view of elements of a carousel coupled to a driving mechanism according to one embodiment of the present disclosure.
Figure 6:
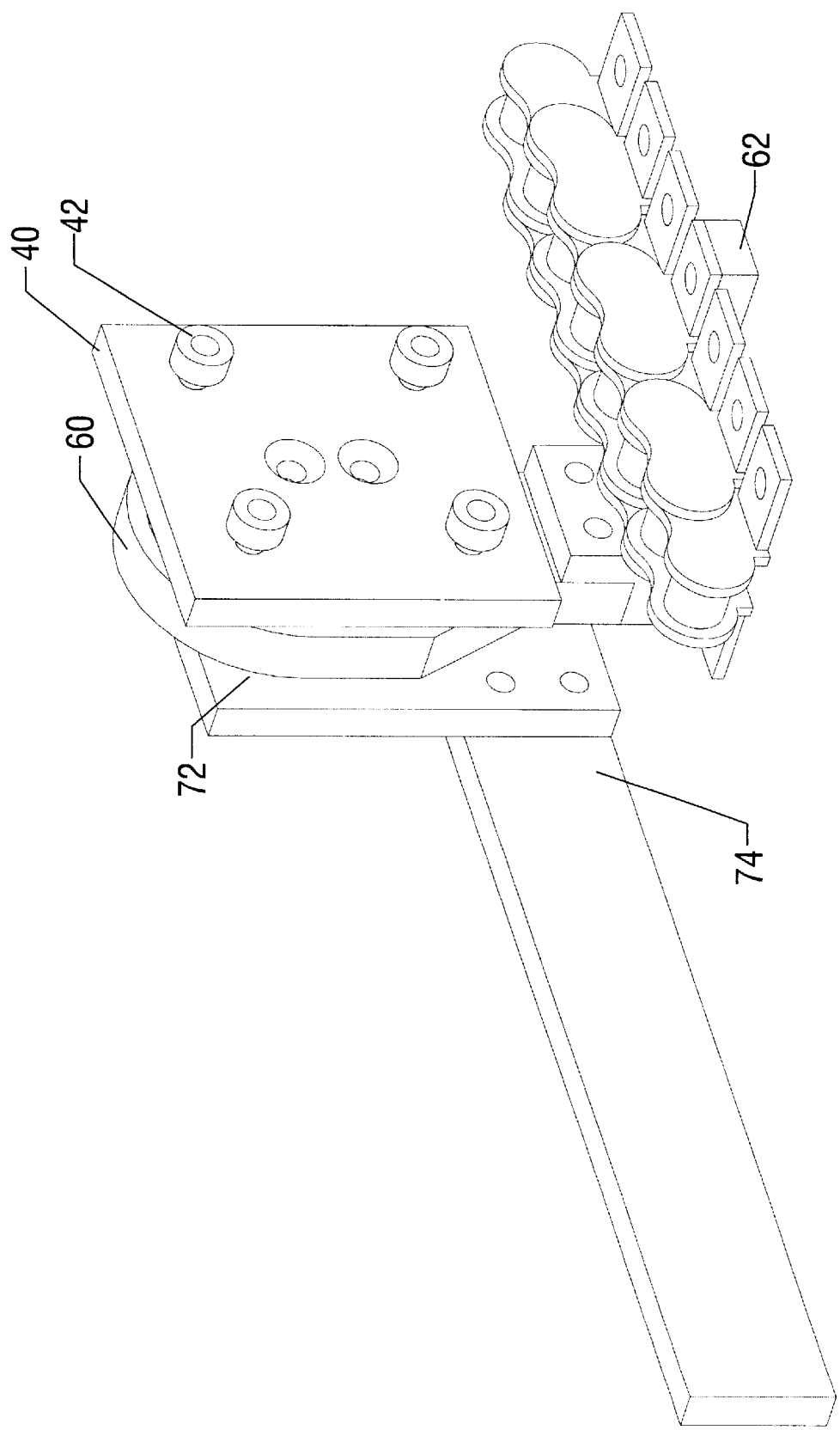
FIG. 6 is a partial perspective view of elements of a carousel coupled to a driving mechanism according to one embodiment of the present disclosure.
Figure 7:
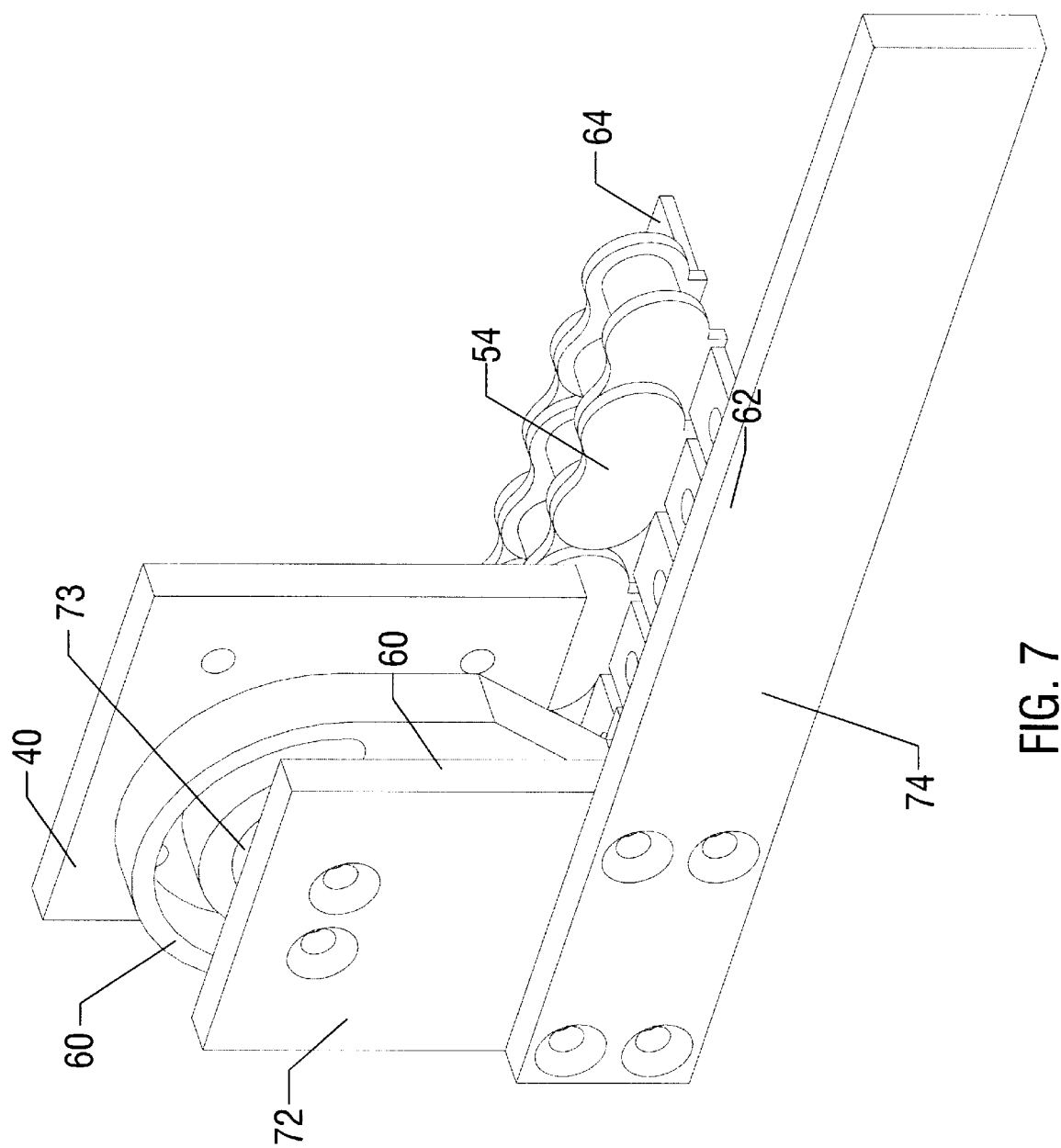
FIG. 7 is a partial perspective view of elements of a carousel coupled to a driving mechanism according to one embodiment of the present disclosure.

In one embodiment, carousel 10 may include one or more pushers 60. FIGS. 5–7 show pushers in greater detail. As used herein, a "pusher" may be any suitable structure adapted to couple motion from a driving mechanism to an alignment block 40. In the illustrated embodiment of FIG. 1, pushers 60 are approximately 1⅝" by 3"×½" blocks of aluminum adapted to connect to attachment chains 54 by an attachment bracket 62. In the illustrated embodiment, attachment brackets 62 may be ¾"×¾"×2½" blocks of aluminum designed to attach to tabs 64 connected to attachment chains 54. Pushers 60 may be coupled to a stabilization bar 75. Stabilization bar 75 may provide a fixed spacing between pusher 60 and the outside profile of track assemblies 20. This fixed distance may reduce or eliminate pusher 60 from moving, jumping, or changing orientation when attachment chain 54 is not under full tension. In one embodiment, stabilization bar 75 may be between about 0.1 and about 0.5 inches, and more particularly about 0.323 inches. In one embodiment, the length of stabilization bar 75 may be about 3 inches.

Pushers 60 may couple to a driving mechanism and may be rotatably coupled to an alignment block 40. The rotatable coupling may be achieved by several methods known in the art, including, but not limited to roller bearings, oilite bearings, plastic bearings or bearing surfaces, or journal bearings. In the illustrated embodiment, the rotatable coupling may be achieved through the use of plastic bearing surfaces, i.e., a loose-fit hole in the pushers 60 rotating about a delrin shaft 73. Pushers 60 may direct alignment blocks 40 along tracks and may rotate about alignment blocks 40 to affect a change in direction of the alignment blocks 40.

Being coupled to attachment chains 54, pushers 60 may be moved generally along closed circuits defined by two or more tracks of carousel 10. Pushers 60 may transfer their motion to alignment blocks 40 by being coupled to alignment blocks 40. More specifically, as attachment chains 54 move, pushers 60 may follow because of the coupling between chains 54 and pushers 60. Likewise, alignment blocks 40 may move because of the rotatable coupling between pushers 60 and alignment blocks 40. This rotatable coupling, between pushers 60 and alignment blocks 40, may allow alignment blocks 40 to change directions along closed circuits while maintaining a fixed orientation, as demonstrated by the embodiment of FIG. 1.

Turning to FIG. 1, it may be seen that an alignment block 40 is traveling along generally horizontal tracks 45 and 47. In this illustrated embodiment, pusher 60 is in an orientation in which a rounded end of pusher 60 is pointing upwards. It is to be noted that pusher 60 need not have any specific shape, such as a rounded corner. In fact, the size and shape of pushers 60 may be varied according to need. The rounded portion of pushers 60 in FIG. 1 serves to better illustrate the relative orientations of different pushers positioned at varying locations within carousel 10. Pusher 60 may direct alignment block 40 towards corner 70*a*. When alignment block 40 reaches corner 70*a*, a change in direction is encountered—alignment block 40 may now move upward along a generally vertical portion of track—left generally vertical portion 39. As alignment block 40 reaches corner 70*a*, pusher 60 may rotate clockwise about alignment block 40 (so that the rounded portion of pusher 60 points generally to the right in a direction generally parallel with tracks 45 and 47). During the rotation, alignment block 40 may remain substantially fixed in place at corner 70. With the rotation complete, pusher 60 again directs alignment block 40, but now, the direction may be in a generally vertical direction, and pusher 60 now may have a different orientation relative to alignment block. At this point, cam follower bearings 42 begin moving in the next set of tracks, here, tracks 37 and 38. However, throughout the process of changing direction, the orientation of alignment block 40 remains fixed. As illustrated, that fixed orientation is a fixed, upright position.

Moving about a generally vertical portion of tracks defined by tracks 37 and 38, alignment block 40 may reach corner 70*b*. Upon reaching this corner, once again, alignment block 40 may pause while pusher 60 rotates clockwise about alignment block 40 to affect yet another change in direction. Referring to FIG. 1, it may be seen that this rotation may leave the rounded portion of pusher 60 pointing at a downward right angle, an angle generally perpendicular to attachment chain 54. Alignment block 40 and pusher 60 may continue in their illustrated orientation until corner 70*c* is reached. Once again, alignment block 40 may pause or come to a stop while pusher 60 rotates about alignment block 40 to affect a change in direction. This time, pusher 60 may rotate until the rounded portion of pusher 60 points generally downward, again at an angle generally perpendicular to attachment chain 54. At that point, pusher 60 may again exert a force upon alignment block 40, the force being directed generally along the direction of the closed circuit, and alignment block 40 may then change tracks and, hence, change direction. As corner 70*d* is reached, alignment block 40 may pause as pusher 60 again rotates clockwise into the orientation illustrated in FIG. 1, with the rounded portion of pusher 60 pointing generally to the left in a direction generally parallel with tracks 45 and 47. Motion may continue in this manner, causing an alignment block 40 to travel recirculatively about the closed circuit of carousel 10, all the while maintaining a fixed orientation.

In the illustrated embodiment of FIG. 1, sprockets are positioned generally at each corner of carousel 10. Thus, for example, a sprocket may be positioned adjacent corners 70*a*, 70*b*, 70*c*, and 70*d*, and 70*e* (the view of the sprockets themselves being partially or totally blocked by inner plate 22 and other elements of carousel 10). The alignment blocks 40 may be moved by pushers 60 with a contact point moving on a line that generally connects the center line of all the sprockets. In this way, a pusher 60 may move an alignment block 40 towards the center of a sprocket positioned generally at a corner of carousel 10. The pusher 60 may then rotate generally about the sprocket center, the alignment block 40 not moving until pusher 60 becomes generally perpendicular to the attachment chain 54. At that point, pusher 60 continues to direct the alignment block 40 about the closed circuit, now engaging different tracks, generally along a line joining the sprockets.

In operation, carousel 10 may be used to recirculatively transport an item or product. More specifically, carousel 10 may be used to present items to operators upon an assembly line, so that proper items may be placed in appropriate locations upon a product. In the illustrated embodiment of FIG. 1, each alignment block 40 may be coupled to an arm 74 by a bracket 72. In one embodiment, bracket 72 may be non-rotatably coupled to alignment block 40 so that bracket 72 keeps a fixed orientation with alignment block 40. In one embodiment, arm 74 may be non-rotatably coupled to bracket 72, so it too maintains a fixed orientation. In the illustrated embodiment, alignment block 40, bracket 72, and arm 74 are able to travel about the closed circuit of carousel 10 while all maintaining a fixed orientation.

In one embodiment, a supporting member (not shown) may be placed between arms 74 on opposite sides of carousel 10. As used herein, a "supporting member" is any structure which may support one or more items and includes, but is not limited to, a shelf, a bin, a container, a pan, or a nest. On or in such a supporting member may be placed various items. In operation, a driving mechanism may propel alignment blocks 40 of carousel 10 all in tandem. Tandem motion may be achieved, in the illustrated embodiment, through the use of a common drive shaft, similarly situated sprockets, and similar mirror image closed circuit patterns on each side of track assemblies 20.

Advantageously, common drive shaft 52 may propel substantially identical sprockets situated about substantially identical track arrangements on each side of carousel 10 to produce substantially cooperative and mirror image motion of arms 74a and 74b, positioned directly opposite one another and maintaining a fixed, upright position. In such a manner, a supporting member may be placed on arms 74a and 74b so that the alignment blocks 40, and more specifically, the arms 74, may cooperatively support and move a product or item placed in or on the supporting member.

FIGS. 5–7 better illustrate how an arm 74, a bracket 72, a pusher 60, and an alignment block 40 may be coupled so as to achieve the motion described above. Referring to FIG. 5, there is shown an embodiment in which an arm 74 is non-rotatably coupled to a bracket 72. The coupling may be seen more clearly in FIG. 7, where it is shown that the coupling may be achieved by using four screws that connect arm 74 directly to bracket 72. In these illustrated embodiments, this arm/bracket coupling keeps arm 74 in the same orientation as bracket 72.

In the embodiments depicted in FIGS. 5–7, bracket 72 may be non-rotatably coupled to a shaft 73 having four openings adapted to receive and engage screws. Referring to FIGS. 5 and 7, it may be seen that bracket 72 may be non-rotatably coupled to shaft 73 through the use of two generally horizontal screws in shaft 73. Also non-rotatably coupled to shaft 73 may be an alignment block 40. Referring to the embodiment of FIG. 6, it may be seen that shaft 73 may be non-rotatably coupled to alignment block 40 through the use of two generally vertical screws in shaft 73.

Referring still to the embodiment of FIG. 6, it may be seen that a pusher 60 may be rotatably coupled to alignment block 40. In the illustrated embodiment, pusher 60 is sandwiched between bracket 72 and alignment block 40, but is able to rotate about both bracket 72 and alignment block 40. Again, rotation may be achieved by a rotatable coupling to shaft 73, such as a journal bearing coupling. In this embodiment, even as pusher 60 rotates, the non-rotatable coupling described above ensures that bracket 72 maintains a fixed orientation relative to alignment block 40. Likewise, arm 74 may maintain a fixed orientation.

Figure 8:
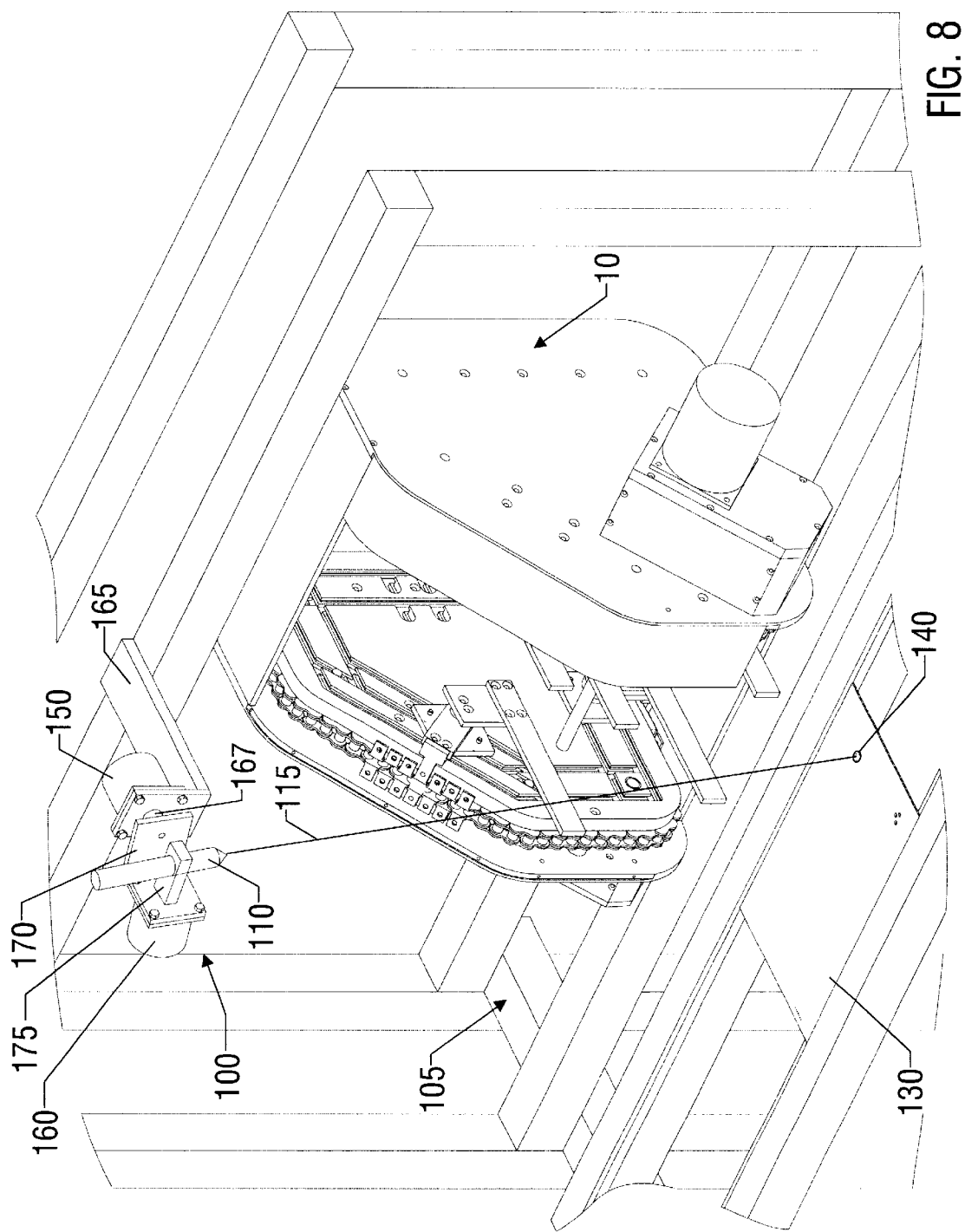
FIG. 8 is a schematic view showing a programmable location indicator system according to one embodiment of the present disclosure.

FIG. 8 shows one embodiment in which carousel 10 includes a programmable location indicator system 100. With the benefit of this disclosure, it will be apparent that Indicator system 100 may be used with any of the embodiments disclosed herein. Any programmable location indicator known in the art for switchable pointing may be employed, such as a laser pointer. Programmable location indicator system 100 may be configured so that it may visually direct an operator where to install a part or product that is removed from a particular bin or holder of carousel 10. Programmable location indicator system 100 may include a light pointer 110, and one or more motors coupled to the light pointer. The illustrated embodiment employs two motors, motors 150 and 160. The motors may be connected to a user interface of carousel 10.

Light pointer 110 may be a fixture in the workstation area 105. As illustrated, light pointer 110 may be positioned overhead carousel 10, but any other suitable position may suffice. In one embodiment, when carousel 10 presents a particular product to an operator, motors 150 and 160 may be programmed to move light pointer 110 so that it points to a specific location 140 on a work piece 130 so that an operator may be directed where to place a product he or she removes from carousel 10. In this manner, the likelihood of operator error associated with incorrect placement of a piece may be eliminated, or at least minimized.

In one embodiment, programmable location indicator system 100 may utilize a teach mode. In such an embodiment, a worksurface may be divided into a grid. The system may then be taught how to point to each grid position. By "taught", it is meant that the system may be calibrated so that it may move to certain positions responsive to certain commands. Commands may include an operator physically taking hold of light pointer 100, pointing it appropriately, and storing the sequence of motions in a memory so that the pointer may later re-create the same motions. Alternatively, the system may be pre-programmed for specific grid locations. In another embodiment, an overlay may be set up in work area 105, and a user may first teach the location indicator system to point to an area on the workspace where a part is to be placed. In this embodiment, a part or product may then be presented to an operator via carousel 10 while the programmable location indicator 100, simultaneously, points to a location that was previously taught via the overlay. In such an embodiment, the user may be sure where a part or product is to be placed.

In the illustrated embodiment, light pointer 110 may be moved with motors 150 and 160. Motor 150 may be fixed to a support 165. Motor 160 may be attached to a bracket 170 which mounts on a shaft 167 of motor 150. Light pointer 110 may be mounted to bracket 175 attached to a shaft (the view of which is blocked in FIG. 8) of motor 160. By rotating motors 150 and 160, light pointer 110 may change angles and thus aim light 115 at any point on worksurface 130. In another embodiment, any x-y movement system known in the art may be set up to move the light pointer appropriately. Such embodiments may also provide programmable positioning of light upon a worksurface to reduce or eliminate misplacement errors.

Figure 9:
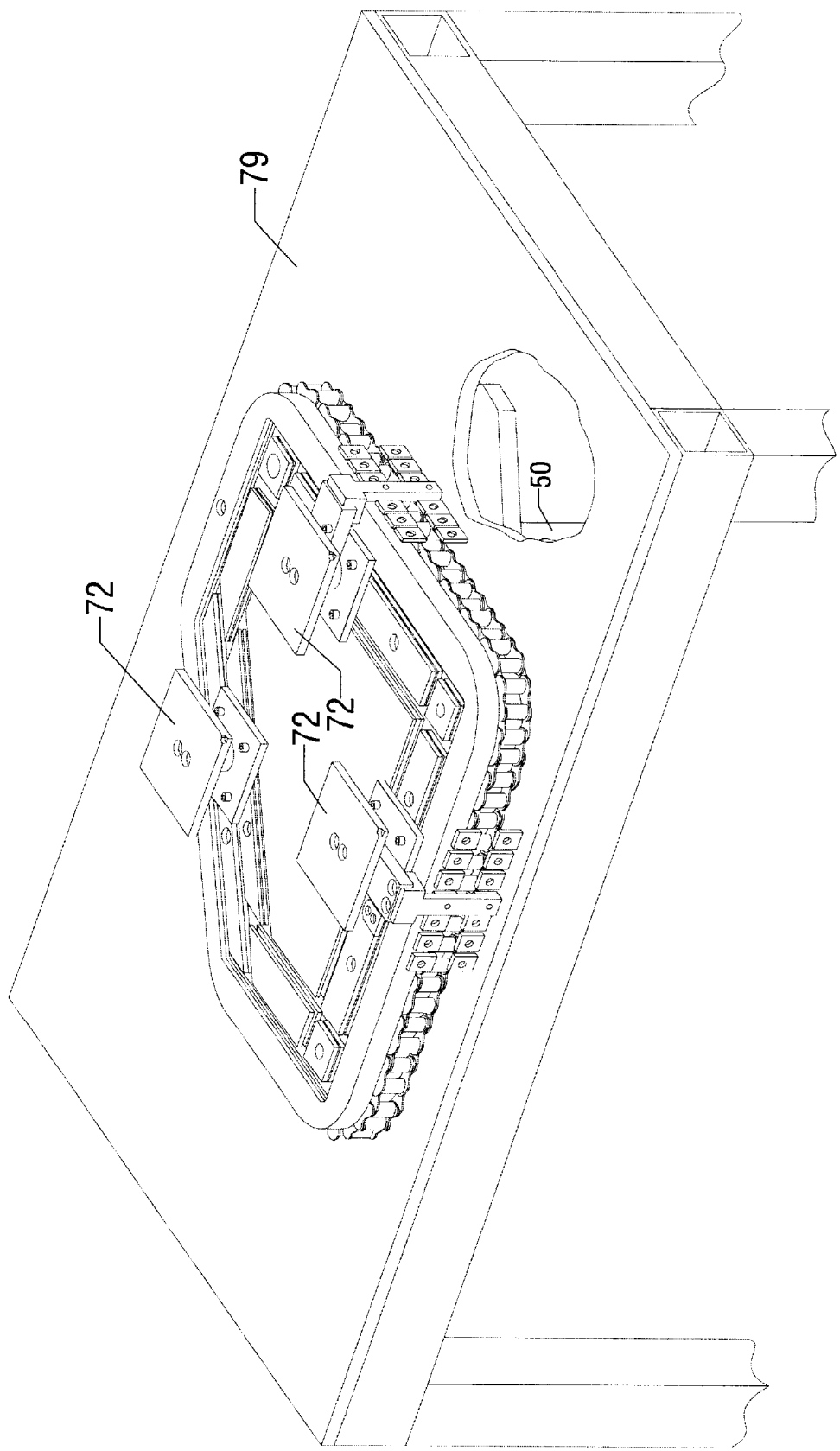
FIG. 9 shows a horizontally situated carousel according to one embodiment of the present disclosure.

The embodiment of FIG. 9 demonstrates that the presently disclosed apparatus may utilize a single track plate that may be orientated horizontally. In this embodiment, motor 50 and appropriate housing may be mounted underneath support structure 79, as shown. In the illustrated embodiment, carousel 10 uses a single track plate—support structure 79. Although illustrated in a horizontal arrangement, those of skill in the art, with the benefit of the present disclosure, will understand that carousel 10 may be situated in numerous alternative orientations. For instance, rather than being situated horizontally, a carousel may be arranged at any arbitrary angle (e.g., a 45 degree angle) as need may dictate.

In the illustrated embodiment of FIG. 9, one or more items may be placed into suitable container(s) that may be coupled to bracket 72. Thus, items may be presented, while traveling in a horizontal path, to a user while maintaining a constant orientation. Potential uses for the system illustrated in FIG. 9 are great. In this orientation, the apparatus may serve, for example, as an automated assembly cell. In such an embodiment, the carousel system may become a conveyor. The conveyor may be used to position items in specific locations and orientations at points along the conveyor for further assembly operations. Being recirculative, an item may be placed on/in a container coupled to brackets 72. The item may move through the assembly cell having various operations performed on it. The item may be removed from the container and the container may then be ready to begin the process again. Operations may include addition of parts, installation of fasteners, pressing of parts onto or into the item, pressing or forming tabs or posts on the item to capture other parts, or other assembly or manufacturing processes known in the art.

In another embodiment, one or more items may be attached underneath carousel 10. For instance, carousel 10 may be inverted (i.e., turned over), and one or more items may be placed into suitable container(s) that may be attached to brackets 72. In such an embodiment, support structure 79 may include an opening that allows the one or more items to hang underneath carousel 10. Inverted, carousel 10 may include a track plate separate from support structure 70. For instance, a track plate such as the one illustrated in FIG. 1 (element 20a) may be used.

Potential uses for such an embodiment are also great. For instance, by coupling a suitable device to the carousel, uses may include the application of pastes, glues, solder, solvents, or other materials to an item as may be done, for example, with an x-y positioning system. Additionally, the embodiment of FIG. 9 may allow for the attachment of a welding head to apply a specific weld pattern to an item. Further, a cutting head such as a laser cutter, plasma cutter, flame cutter, or rotary cutting tool may be attached to the carousel system. More generally, any device that may work in a generally vertical position may be attached to the carousel to allow it to move to specific points while maintaining a specific orientation.

While the present disclosure may be adaptable to various modifications and alternative forms, specific embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims. For instance, the disclosed apparatus may utilize one or more track assemblies 20 spaced according to needs. The disclosed apparatus may utilize any number of alignment blocks 40, and those alignment blocks may be configured differently according to the track placement and the weight of the load to be supported. Also, those of skill in the art will understand that the track patterns of the disclosed apparatus may be modified according to need.

Furthermore, it will be understood with benefit of this disclosure by those of skill in the art that embodiments of the disclosed apparatus and method may be advantageously employed for a variety of purposes and with a variety of other features. For example, loads which may be transported in using the disclosed apparatus and method include, but are not limited to shelves, bins or other containers for holding or supporting items such as products, parts, medical devices, fasteners, automobiles, carriages, people (skiers, workmen, amusement park riders, etc.), freight, luggage, etc. Other examples of loads include, but are not limited to tools, lights or lamps, electronic devices, etc. Furthermore, it will be understood with benefit of this disclosure that a load may be any other object known in the art that would benefit by transport or recirculative transport as described elsewhere herein. Alternatively, a load may not be present where, for example, the motion of the disclosed apparatus may be employed for visual or other non-transportative purpose/s.

Specific examples of just a few other possible embodiments of the disclosed apparatus and method include use in conjunction or cooperation with automatic part mounting systems such as those described in U.S. Pat. No. 4,681,452, which is incorporated herein by reference. Also possible are larger scale embodiments of the disclosed apparatus for use in transporting loads such as articles or vehicles, for example, for use with the types of loads described in U.S. Pat. Nos. 4,493,414; 4,067,437; and 5,207,314; which are incorporated herein by reference.

Moreover, the different aspects of the disclosed apparatus and methods may be utilized in various combinations and/or independently. Thus the invention is not limited to only those combinations shown herein, but rather may include other combinations.

What is claimed is:

1. An apparatus comprising:
   a track plate;
   two or more tracks within said track plate arranged in a spaced relationship, said two or more tracks defining a closed circuit; and
   an alignment block configured to engage said two or more tracks to constrain rotational motion of said alignment block and to travel about said closed circuit while maintaining a fixed orientation.

2. The apparatus of claim 1, wherein said alignment block engages said two or more tracks with two or more bearings.

3. The apparatus of claim 1, wherein at least one of said two or more tracks comprises a T-slot.

4. The apparatus of claim 1, wherein said closed circuit comprises a polygon shape.

5. The apparatus of claim 1, wherein said track plate is oriented horizontally.

6. The apparatus of claim 5, wherein said track plate comprises a horizontal support structure.

7. The apparatus of claim 1, further comprising a driving mechanism coupled to said alignment block and configured to drive said alignment block about said closed circuit.

8. The apparatus of claim 7, wherein said driving mechanism comprises a motor and an attachment chain coupled to said motor.

9. The apparatus of claim 8, wherein said track plate comprises an inner plate in spaced relationship with an outer plate, said drive chain being disposed generally between said inner and outer plates, said motor being outwardly adjacent said outer plate, and said alignment block being inwardly adjacent said inner plate.

10. The apparatus of claim 7, further comprising a pusher coupled to said driving mechanism and rotatably coupled to said alignment block, said pusher configured to direct said alignment block along said two or more tracks and to rotate about said alignment block to affect a change in direction of said alignment block.

11. The apparatus of claim 10, further comprising a bracket coupled to said pusher, said bracket configured to support a container or device.

12. The apparatus of claim 11, wherein said device comprises a paste applicator, a glue applicator, a solder gun, a welding head, a laser cutter, a plasma cutter, a flame cutter, a rotary cutting tool, or any combination thereof.

13. A carousel, comprising:
   a track plate;
   a set of tracks configured in operative relation to said track plate and defining a closed circuit;
   an alignment block configured to engage said set of tracks to constrain rotational motion of said alignment block;
   a driving mechanism configured to drive said alignment block about said closed circuit;
   a pusher coupled to said driving mechanism and rotatably coupled to said alignment block, said pusher configured to rotate about said alignment block to affect a change in direction of said alignment block as said alignment block travels about said closed circuit; and wherein said alignment block is adapted to at least partially support or guide a load and to travel about said closed circuit while maintaining a fixed orientation so that the load may be transported.

14. The carousel of claim 13, wherein said driving mechanism comprises:

a motor;

an attachment chain coupled to said pusher; and a drive shaft coupling said attachment chain to said motor.

15. The carousel of claim 13, wherein said track plate is arranged vertically.

16. The carousel of claim 13, wherein said track plate is arranged horizontally.

17. The carousel of claim 13, further comprising a bracket coupled to said pusher.

18. The carousel of claim 13, further comprising:

an arm coupled to alignment block;

a supporting member coupled to said arm; and wherein said arm is configured to cooperatively support said supporting member and is adapted to travel about said closed circuit with said supporting member remaining in a fixed orientation.

19. The carousel of claim 13, wherein said set of tracks comprises a set of T-slots.

20. The carousel of claim 13, wherein said alignment block engages said set of tracks by two or more cam-following bearings.

21. The carousel of claim 13, wherein said set of tracks comprises a first portion including a first number of tracks and a second portion including a second number of tracks.

22. The carousel of claim 21, wherein said first number is two and said second number is three.

23. The carousel of claim 13, further comprising a programmable location indicator system in operative relation to said carousel.

24. The carousel of claim 23, wherein said programmable location indicator system comprises a light pointer and a pointer motor coupled to said pointer, said pointer motor configured to direct light from said light pointer in a programmable manner.

25. A carousel, comprising:

a first track plate;

a second track plate;

a first plurality of tracks defining a first closed circuit;

a second plurality of tracks defining a second closed circuit;

a first alignment block configured to engage said first plurality tracks;

two or more cam-following bearings coupled to said first alignment block and configured to constrain rotational motion of said first alignment block upon engagement of said first plurality of tracks;

a second alignment block configured to engage said second plurality of tracks;

two or more cam-following bearings coupled to said second alignment block and configured to constrain rotational motion of said second alignment block upon engagement of said second plurality of tracks;

a driving mechanism;

a first pusher coupled to said driving mechanism and rotatably coupled to said first alignment block, said first pusher configured to direct said first alignment block about said first closed circuit and to rotate about said first alignment block to affect a change in direction of said first alignment block;

a second pusher coupled to said driving mechanism and rotatably coupled to said second alignment block, said second pusher configured to direct said second alignment block about said second closed circuit and to rotate about said second alignment block to affect a change in direction of said second alignment block; and wherein said first and second alignment blocks are adapted to cooperatively support a load and to travel about said first and second closed circuits in tandem, maintaining a constant relative position and a fixed orientation so that the load may be recirculatively transported.

26. The carousel of claim 25, wherein said first plurality of tracks comprises a first plurality of T-slots defined along an interior of said first track plate, and said second plurality of tracks comprises a second plurality of T-slots defined along an interior of said second track plate.

27. The carousel of claim 25, said driving mechanism comprising:

a motor;

a first attachment chain coupled to said first pusher;

a first sprocket configured to engage said first attachment chain;

a second attachment chain coupled to said second pusher;

a second sprocket configured to engage said second attachment chain; and a common drive shaft coupled to said motor and to said first and second sprockets.

28. The carousel of claim 27, wherein:

said first track plate comprises a first inner plate in spaced relationship with a first outer plate;

said second track plate comprises a second inner plate in spaced relationship with a second outer plate;

said first attachment chain is arranged vertically and disposed generally between said first inner and said first outer plate; and said second attachment chain is arranged vertically and disposed generally between said second inner and said second outer plate.

29. The apparatus of claim 25, wherein said closed circuits comprise:

at least one generally horizontal portion comprising at least a top and a bottom parallel track;

at least one generally vertical portion comprising at least a left and a right parallel track; and at least one generally angled portion comprising at least an upper, a center, and a lower parallel track.

30. The apparatus of claim 29, wherein:

four cam-following bearings are coupled to each of said first and second alignment blocks;

two of said four cam-following bearings are generally diagonal;

two of said four cam-following bearings engage said top parallel track;

two of said four cam-following bearings engage said bottom parallel track;

two of said four cam-following bearings engage said left parallel track;

two of said four cam-following bearings engage said right parallel track;

one of said four cam-following bearings engage said upper parallel track;

said two generally diagonal of said four cam-following bearings engage said center parallel track; and one of said four cam-following bearings engage said lower parallel track.

31. The carousel of claim 25, wherein the motion of said alignment blocks is programmable.

32. The carousel of claim 31, further comprising a user interface adapted to transmit instructions to said carousel.

33. The carousel of claim 25, further comprising a programmable location indicator system in operative relation to said carousel.

34. The carousel of claim 33, wherein said programmable location indicator system comprises a light pointer and a pointer motor coupled to said pointer, said pointer motor configured to direct light from said light pointer in a programmable manner.

* * * * *